United States Patent
Langa et al.

[11] Patent Number: 5,520,376
[45] Date of Patent: May 28, 1996

[54] PRE-TWISTED METAL TORSION BAR AND METHOD OF MAKING SAME

[75] Inventors: Mihail R. Langa; Stéphane Georges, both of Nancy, France

[73] Assignee: Allevard, Saint Cloud, France

[21] Appl. No.: 325,120

[22] Filed: Oct. 18, 1994

[30] Foreign Application Priority Data

Oct. 19, 1993 [FR] France ................... 93 12438

[51] Int. Cl.$^6$ ........................................ F16F 1/14
[52] U.S. Cl. .................. 267/273; 280/700; 280/721; 267/154
[58] Field of Search ................... 267/154, 273; 280/700, 721, 723; 29/890.053

[56] References Cited

U.S. PATENT DOCUMENTS

| | | |
|---|---|---|
| 2,452,974 | 11/1948 | Westin et al. . |
| 4,231,555 | 11/1980 | Saito . |
| 4,322,062 | 3/1982 | Aleck ..................... 280/721 |
| 5,163,701 | 11/1992 | Cromley, Jr. ............. 280/700 |

FOREIGN PATENT DOCUMENTS 3830028  12/1989  Germany .

*Primary Examiner*—Matthew C. Graham
*Attorney, Agent, or Firm*—Larson and Taylor

[57] ABSTRACT

The invention relates to a metal torsion bar for vehicle suspension, including a straight central part which has a circular cross-section, the central part extending longitudinally between two fixing heads suitable for being rigidly fixed to other mechanical members, the torsion bar being work-hardened by pretwisting and at least the central part of the torsion bar having an annular cross-section. According to the invention, the cross-section of the central part has a radially outside plasticized zone, which has been deformed plastically by the pretwisting, and a radially inside elastic zone, which has been deformed elastically by the pretwisting, the cross-section of the central part of the torsion bar having a total area S and the plasticized zone having an area Sp such that their ratio Sp/S is at least equal to 0.5 and at most equal to 0.6.

5 Claims, 1 Drawing Sheet

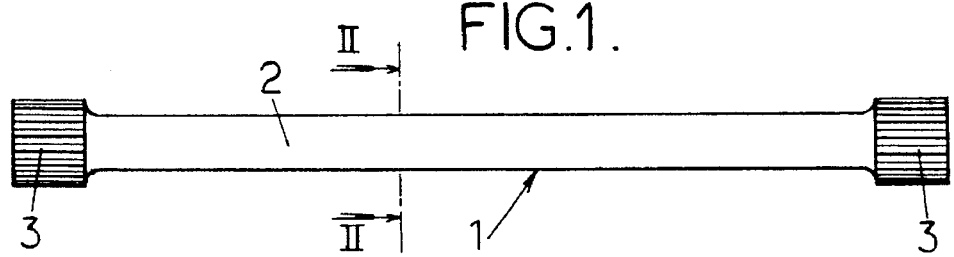
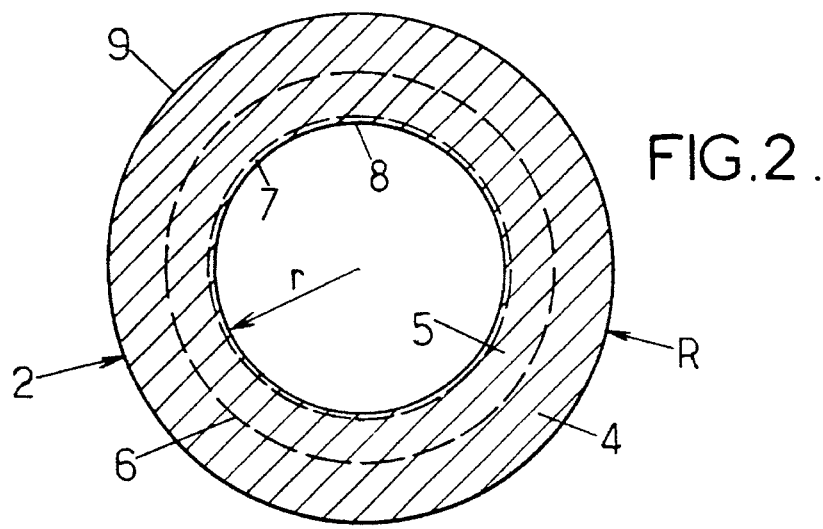
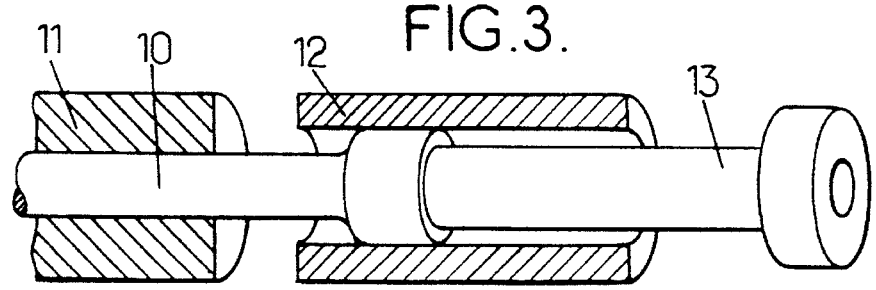
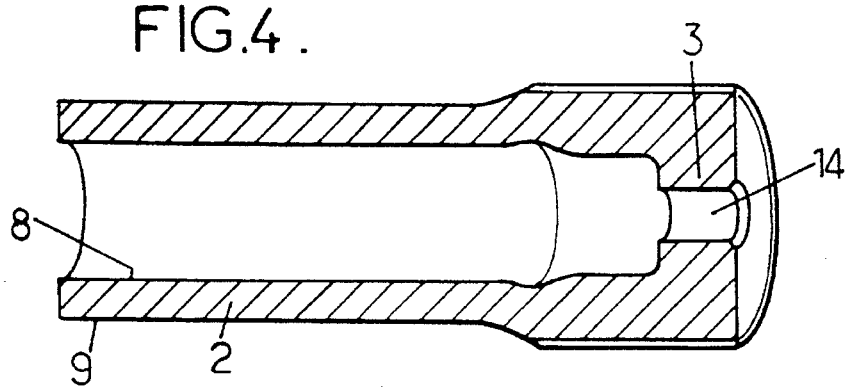

PRE-TWISTED METAL TORSION BAR AND METHOD OF MAKING SAME

FIELD OF THE INVENTION

The present invention relates to metal torsion bars, especially for vehicle suspensions,

DESCRIPTION OF RELATED ART

Such torsion bars usually include a straight central part which has a circular cross-section, the said central part extending longitudinally between two fixing heads suitable for being rigidly fixed to other mechanical members, the said torsion bar being work-hardened by pretwisting.

Generally, torsion bars currently used have a solid cross-section, which makes them unnecessarily heavy, insofar as the central part of the solid cross-section works very little in torsion.

In order to overcome this drawback, hollow torsion bars, at least the central part of which has an annular cross-section, have been proposed in the prior art and especially in the document U.S. Pat. No. 4,231,555.

However, the hollow torsion bars of the prior art generally had poor fatigue strength.

SUMMARY OF THE INVENTION

The object of the present invention is to overcome this drawback.

For this purpose, a hollow metal torsion bar of the kind in question is essentially characterized in that the cross-section of the central part of the torsion bar has a radially outside plasticized zone, which has been deformed plastically by the pretwisting, and a radially inside elastic zone, which has been deformed elastically by the pretwisting, the annular cross-section of the central part of the torsion bar having a total area S and the plasticized zone having an area Sp such that the ratio Sp/S is at least equal to 0.5 and at most equal to 0.6.

By virtue of this arrangement, a torsion bar is obtained which, compared to a solid torsion bar having the same mechanical elasticity characteristics in torsion, has a low mass for only a very slightly greater outside diameter, and this is so while maintaining a satisfactory fatigue strength.

In the most common embodiments, it is possible to obtain a mass reduction of 30 to 35% with respect to a solid bar, for a diameter increase of the order of 5%.

Advantageously, at least the central part of the torsion bar has an inside surface from which extends radially a zone subjected to residual compressive stresses, the said zone having a radial thickness at least equal to 0.3 mm.

The subject of the present invention is also a method of manufacturing a metal torsion bar, such as defined hereinabove, which includes the following steps:

subjecting a tubular torsion bar to a pretorque whose value is chosen so that the above-mentioned ratio Sp/S is at least equal to 0.5 and at most equal to 0.6, and subjecting the inside surface of at least the central part of the torsion bar to shot peening sufficient to create residual compressive stresses to a thickness of at least 0.3 mm from the said inside surface.

Thus, the shot-peening step makes it possible to eliminate the residual tensile stresses which are generally created on the inside surface of the bar following the pretwisting work-hardening, which tensile stresses have a negative effect on the fatigue strength of the bar.

Furthermore, inspection of the surface finish on the inside of the bar is relatively difficult since the inside surface is not very accessible. Consequently, it is difficult to detect surface defects having depths less than 0.2 mm. On account of the fact that the shot peening creates residual compression to a thickness greater than 0.3 mm, the consequences of these surface defects are eliminated, this markedly improving the fatigue strength of the torsion bar.

Other characteristics and advantages of the invention will appear in the course of the following description of one its embodiments, given by way of non-limiting example, with regard to the attached drawings.

BRIEF DESCRIPTION OF THE DRAWINGS

In the drawings:

FIG. 1 is a diagrammatic side view of a torsion bar according to one embodiment of the invention, FIG. 2 is a sectional view taken along the line II—II of FIG. 1, FIG. 3 is a diagrammatic view illustrating the shaping of the fixing heads of the torsion bar of the preceding figures, and FIG. 4 is a longitudinal sectional view of one of the fixing heads obtained by the method illustrated in FIG. 3.

DESCRIPTION OF PREFERRED EMBODIMENTS

The torsion bar 1 depicted in FIG. 1 includes a straight central part 2, extending longitudinally between two fixing heads 3 which, in the example depicted, have a splined outside surface.

When the torsion bar 1 is fitted into a vehicle, one of the fixing heads 3 is generally fastened rigidly to the chassis of the vehicle, whereas the other fixing head 3 is fastened rigidly to an articulation carrying one of the wheels of the vehicle, so that the oscillation movements of the said articulation create torsional moments in the torsion bar 1.

As depicted in FIG. 2, the torsion bar according to the present invention has, at least in its central part 2 and preferably over its entire length, an annular hollow cross-section. Thus, the central part 2 of the torsion bar includes an outside surface 9 of revolution, having a radius R, and an inside surface 8 of revolution, having a radius r.

This torsion bar is formed by upset forging starting from a metal tube 10 of inside radius r and of outside radius R, as depicted diagrammatically in FIG. 3.

In order to do this, the tube 10 is held between jaws 11, and a cylindrical die 12 is placed around one end of the tube 10, the said die 12 having an inside diameter equal to the outside diameter of the fixing head 3 to be formed.

Furthermore, an anvil 13 is pressed axially against the end of the tube 10, while an electrical voltage is generated between the Jaw 11 and the anvil 13 so as to heat the tube 10 by the passage of electrical current.

In this manner, the end of the tube 10 is upset so that it increases in diameter up to the inside diameter of the die 12. A central bore 14 is then made in the axial end of the bar in order to be able to gain access to the inside of the said bar.

This way of shaping the tube 10, which is used conventionally for shaping solid torsion bars, has the particular advantage here of increasing the thickness of material in the region of the fixing heads 3, as depicted in FIG. 4.

The mechanical strength of the fixing heads 3, subjected to particularly high stress concentrations, is thus increased.

Furthermore, this thickness increase enables the splines on the outside surface of the fixing heads 3 to be produced more easily, for example by knurling.

After this shaping, the torsion bar is subjected to a torque whose value is sufficient to lead to work-hardening of the metal material of which the said tube is composed.

More particularly, this torque is chosen so that the cross-section of the torsion bar has a radially outside annular plasticized zone 4 (see FIG. 2), which undergoes plastic deformation during the work-hardening operation, and a radially inside annular elastic zone 5, which undergoes elastic deformation during the said work-hardening operation.

When the pretorque is released, the plasticized zone 4 tends to maintain its final deformation created by the pretorque, whereas the elastic zone 5 tends to return elastically to its initial shape. This results in shear stresses within the material, which stresses are zero on a surface of revolution 6 concentric with the inside surface 8 and the outside surface 9, this surface 6 also being the boundary between the plasticized zone 4 and the elastic zone 5.

According to the invention, in order for the torsion bar to have good fatigue strength, it is necessary that the ratio Sp/S between the area of the cross-section of the plasticized zone 4 (Sp) and the total area of the annular cross-section of the central part of the torsion bar ($S=\pi[R^2-r^2]$), be at least equal to 0.5 and at most equal to 0.6.

After work-hardening the torsion bar, its inside surface and outside surface 9 are generally subjected to shot peening which makes it possible, in particular, to eliminate possible tensile stresses in the vicinity of its inside and outside surfaces and to introduce compressive stresses making it possible to delay the initiation of cracks which could be initiated from surface defects in the torsion bar. Thus, the lifetime of the torsion bar is improved.

In particular, the parameters of the shot peening applied to the inside surface 8 of the torsion bar are chosen so as to generate residual compressive stresses in an annular zone 7 (indicated diagrammatically by the dotted lines in FIG. 2), to a thickness equal to at least 0.3 mm, this making it possible to treat, especially, the surface defects which are not detectable on the inside of the torsion bar, that is to say in the current state of the art, the surface defects having a depth of less than 0.2 mm.

In one particular embodiment example, a torsion bar according to the invention has been produced from a manganese/boron steel having a rupture strength of 1150 MPa.

The dimensions of this torsion bar are as follows:

total length: 582 mm, equivalent elastic length (taking into account the embedding of the fixing heads): 530 mm, outside diameter R: 24.23 mm, inside diameter r: 15.5 mm, outside diameter of the splined fixing heads 3: 30 mm, length of the fixing heads 3: 21 mm, radius of the connecting fillet between the central part 2 and the fixing heads 3: 20 mm minimum.

This torsion bar has amass of 1.37 kg.

It has been shaped by upset forging and then subjected to pretwisting work-hardening under a pretorque of 1753.94 N.m, the ratio Sp/S obtained being equal to 0.54.

After work-hardening, the torsion bar was subjected to external shot peening with balls of 0.3 mm diameter, for a saturation of 90% (90% of the outside surface having been touched by the balls), and an Almen A2 intensity greater than or equal to 0.3 mm (standardized parameter representative of the intensity of the shot peening).

The inside surface of the torsion bar was also treated by shot peening in order to obtain a treatment depth (thickness of the zone 7) of 0.36 mm and an Almen A intensity greater than or equal to 0.4 mm.

The torsion bar thus obtained was subjected to a cyclic torsional fatigue test in which the torsion bar was subjected to a static moment of 819 N.m, corresponding to an angular torsion of a certain angle α, the bar being subjected to successive angular torsions of more or less 11.6° about this static angle α, the said angle α being greater than 11.6°.

According to the standards in force in France, the fatigue strength of a torsion bar is generally characterized by the B10% parameter corresponding to a number of torsion cycles such that, according to the so-called Weibull law, the probability for a torsion bar breaking after a number of cycles less than the said B10% parameter is equal to 10%.

The French standards impose a B10% parameter equal to 150,000 cycles.

The same B10% parameter, measured for the particular torsion bar described hereinabove, is 320,000 cycles, that is 113% above the standard.

The same test was performed without internal shot peening of the torsion bar and gave a B10% parameter of 220,000 cycles, that is 48% above the standard, this today being excellent.

We claim:

1. Metal torsion bar, including a straight central part which has a circular cross-section, said central part extending longitudinally between two fixing heads suitable for being rigidly fixed to other mechanical members, the said torsion bar being work-hardened by pretwisting, at least the central part of the torsion bar having an annular cross-section, wherein the cross-section of the said central part has a radially outside plasticized zone, which has been deformed plastically by the pretwisting, and a radially inside elastic zone, which has been deformed elastically by the pretwisting, the annular cross-section of the central part of the torsion bar having a total area S and the plasticized zone having an area Sp such that the ratio Sp/S is at least equal to 0.5 and at most equal to 0.6.

2. Torsion bar according to claim 1, in which at least the central part has an inside surface from which extends radially an annular zone subjected to residual compressive stresses, said annular zone having a radial thickness at least equal to 0.3 mm.

3. Method of manufacturing a metal torsion bar, including a straight central part which has a circular cross-section, the said central part extending longitudinally between two fixing heads suitable for being rigidly fixed to other mechanical members, the said torsion bar being work-hardened by pretwisting, at least the central part of the torsion bar having an annular cross-section and thus having an inside surface, this method comprising subjecting a tubular torsion bar to a pretorque whose value is chosen so that the cross-section of the central part of the torsion bar has a radially outside plasticized zone, deformed plastically by the pretwisting, and a radially inside elastic zone, deformed elastically by the pretwisting, the annular cross-section of the central part of the torsion bar having a total area S and the plasticized zone having an area Sp such that the ratio Sp/S is at least equal to 0.5 and at most equal to 0.6, and working the inside surface of at least the central part of the torsion bar to create residual compressive stresses to a radial thickness of at least 0.3 mm from the said inside surface.

4. Method according to claim 3, in which the fixing heads are formed by upset forging starting from a cylindrical tube.

5. Method according to claim 3 in which said working comprising shot peening.

* * * * *